United States Patent [19]

Kudo et al.

[11] Patent Number: 4,976,294

[45] Date of Patent: Dec. 11, 1990

[54] METHOD AND APPARATUS FOR MAKING SPECIFIED-LENGTH WIRES FOR WIRE HARNESS

[75] Inventors: Shigeji Kudo; Suzuki Sanae; Hideaki Morita; Hiroo Suzuki, all of Gotenba, Japan

[73] Assignee: Yazaki Corporation, Minato, Japan

[21] Appl. No.: 363,832

[22] Filed: Jun. 9, 1989

[30] Foreign Application Priority Data

Jun. 13, 1988 [JP] Japan ............................... 63-143556

[51] Int. Cl.[5] .......................... B21F 1/00; B23P 23/00

[52] U.S. Cl. .................................... 140/102; 29/564.6

[58] Field of Search ............ 140/102, 71 R; 29/33 M, 29/38.9, 56.6, 243.57, 564.1, 564.6, 564.8; 83/279, 280, 418, 437; 72/293, 294, 338, 298

[56] References Cited

U.S. PATENT DOCUMENTS

| | | | |
|---|---|---|---|
| 2,976,895 | 3/1961 | Durham, Jr. | 140/102 |
| 3,638,687 | 2/1972 | Bardo | 140/102 |
| 4,375,229 | 3/1983 | Mikami et al. | 140/102 |
| 4,715,099 | 12/1987 | Yoshida | 29/564.6 |
| 4,793,038 | 12/1988 | Guerout et al. | 29/564.6 |

FOREIGN PATENT DOCUMENTS

| | | |
|---|---|---|
| 51-136186 | 11/1976 | Japan . |
| 62-12604 | 3/1987 | Japan . |

*Primary Examiner*—Robert L. Spruill

*Attorney, Agent, or Firm*—Armstrong, Nikaido, Marmelstein, Kubovcik & Murray

[57] ABSTRACT

A method of making specified-length wires for wire harness from continuous wires consists of the steps of: fixing a front end of the U-bent continuous wire and pulling the U-bent wire to pay out a predetermined amount thereof; and cutting the U-bent, pulled wire at a portion almost opposite to the fixed front end. An apparatus for putting the above method into practice comprises: a rotatable wire bending head for holding the front end of a continuous wire by wire clamp plates and bending the wire in a U-shape; a wire pulling head for engaging or holding the U-shaped portion and pulling it in the axial direction of the wire to pay out a predetermined amount thereof; and a cutting blade for cutting the U-bent, pulled wire at a position almost opposite to the front end.

10 Claims, 17 Drawing Sheets

METHOD AND APPARATUS FOR MAKING SPECIFIED-LENGTH WIRES FOR WIRE HARNESS

BACKGROUND OF THE INVENTION

1. Field of the Invention

This invention relates to a method and an apparatus for making wires of varied lengths that make up a wire harness.

2. Description of the Prior Art

The method and apparatus for making wires of desired lengths (simply referred to as specified-length wires) that make up a wire harness from continuous insulated wires are known, as disclosed in the Japanese Patent Unexamined Publication No. 136186/1976 and Japanese Patent Examined Publication No. 12604/1987. In these conventional arts, the front end of the continuous wire is looped and the wire is paid out while its length is measured by a pinch roll. After being cut, the wire is gripped at both ends and transferred to the next process by a pallet or transfer clamp chain in a direction perpendicular to the wire axis.

The conventional arts measure the wire length by the pinch roll during wire feeding. This method necessarily makes the equipment complicated and large becaused of the high level of precision required. Another drawback is that since in making a wire of a certain length the pinch roll must be rotated the same length, the process of feeding and metering the wire takes time.

SUMMARY OF THE INVENTION

This invention has been accomplished to overcome the above-mentioned drawbacks.

It is therefore an object of the invention to provide a method and apparatus which is simple in construction and which permits accurate measurement of wire length, thereby making it possible to manufacture specified-length wires in shorter times.

To achieve the above objective, a method of this invention for making specified-length wires for wire harness from continuous wires is characterized in comprising the steps of: fixing a front end of the continuous wire and pulling the U-bent wire to pay out a predetermined amount thereof; and cutting the U-folded, pulled wire at a portion almost opposite to the fixed front end. In this method, if the front end portion of the continuous wire is not preworked into a U shape, a step of bending the wire end into the U shape need only be added.

An apparatus for putting the above method into practice is characterized in comprising: a rotatable wire bending head for holding the front end of a continuous wire by wire clamp plates and bending the wire in a U shape; a wire pulling head for engaging or holding the U-shaped portion and pulling it in the axial direction of the wire to pay out a predetermined amount thereof; and a cutting blade for cutting the U-folded, pulled wire at a portion almost opposite to the front end.

To continuously manufacture the specified-length wires, the apparatus need only be added with a transfer head for transferring the U-bent portion, a second holding member for folding the U-bent portion transferred thereto, and a wire fixing head that has wire fixing plates for fixing the U-bent portion of the wire to the second holding member.

With this invention, since the wire is fed by bending the front end of the continuous wire in U shape and pulling the U-bent portion, the manufacture of a wire of a certain length requires the folded wire to be pulled only half the required total length of the wire section to be made, thus reducing the wire metering and feeding time to one-half when compared with the conventional method using a pinch roller.

As the wire pulling requires no complex mechanism and can be done with high precision by a simple mechanism, the apparatus can be manufactured at low cost.

If the process of bending the end portion of the continuous wire in a U shape and the wire pulling process are separated as by using the transfer head, it is possible, as described later, to perform the wire cutting and the U-bending almost at the same time, making manufacture of the specified-length wires quicker.

Now, the invention will be described in detail by referring to the attached drawings that show one embodiment.

DESCRIPTION OF PREFERRED EMBODIMENTS

Figure 1:
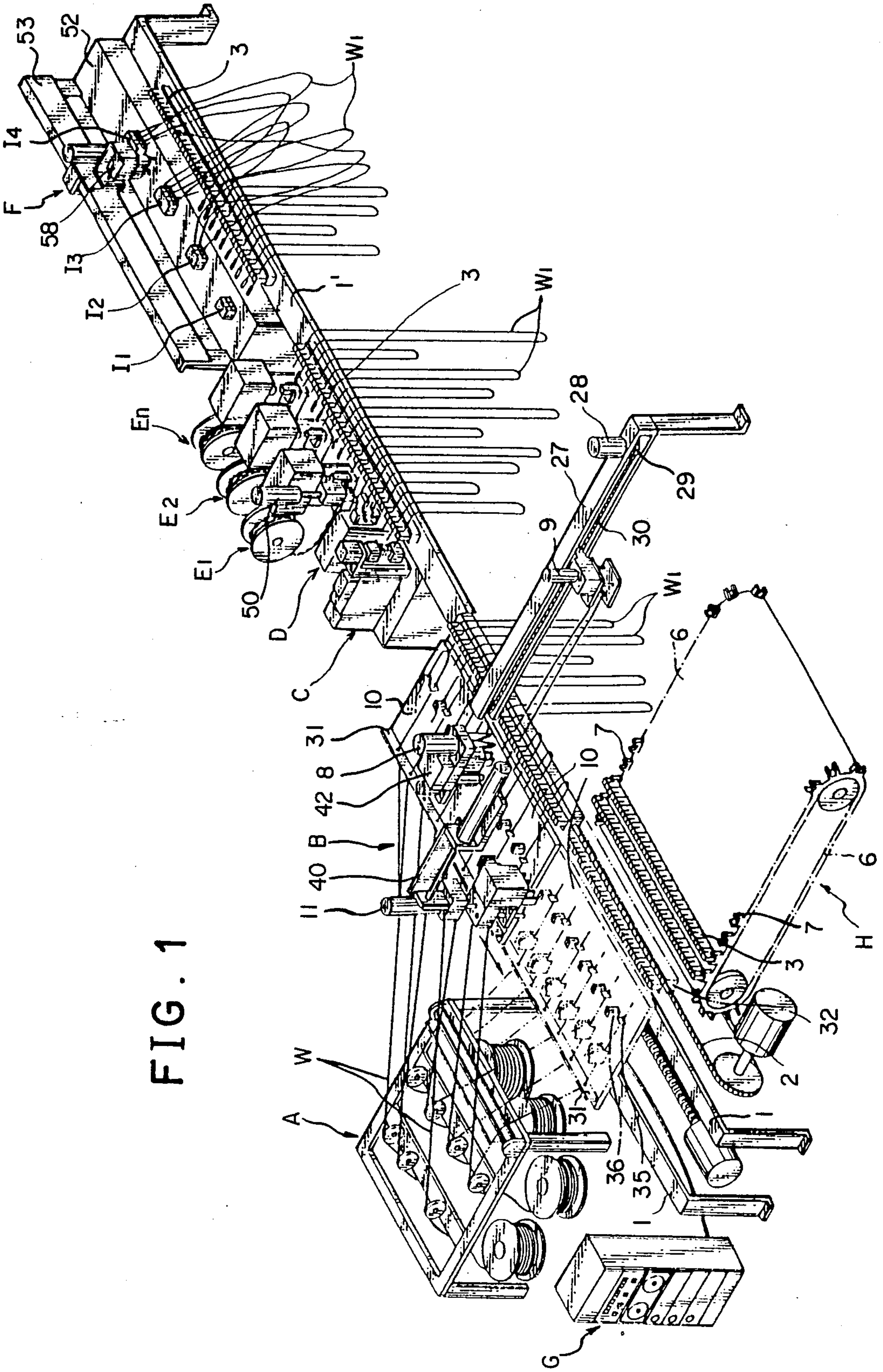
FIG. 1 is a perspective view showing the overall arrangement of an automatic terminal insertion system, including the apparatus of this invention, for inserting terminal-carrying wire ends into connector housings.

FIG. 1 is an overall perspective view showing an automatic wire insertion system, including an apparatus of this invention, for automatically inserting terminal-carrying wire ends into connector housings.

The automatic wire insertion process for terminated wire ends consists of the steps of: making specified-length wires; stripping the specified-length wires of insulation; crimping the terminals on the wires (including composite crimping of two or more wires with a single terminal); and installing the terminal-carrying wire ends into a case.

Reference numerals 1 and 1' represent transfer tables for moving wire clamp bars 3 used in a variety of processes and have an endless chain 2. Installed along the transfer table 1, from left to right, are a specified-length wire making device B for cutting the continuous wire W on the reel station a into sections of desired lenths $W_1$; a wire correction device C; a wire insulation stripping device D; a plurality of terminal crimping devices $E_1$, $E_2$, . . . ; and a terminal encasing device F in the order. Reference numeral G denotes a controller that operates these devices according to the preprogrammed information. In this system, the devices C, D and $E_1$, $E_2$, . . . may be of a known construction.

Figure 2A:
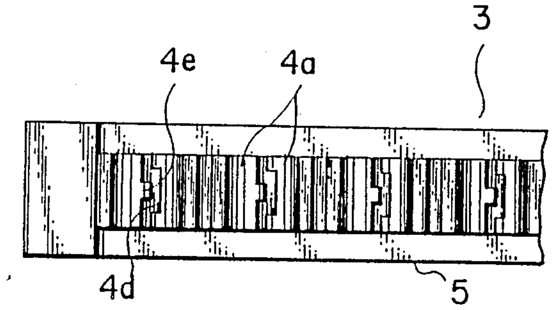
FIGS. 2*a* and 2*b* are enlarged plan and elevational views of a wire clamp bar used in this invention.
Figure 2B:
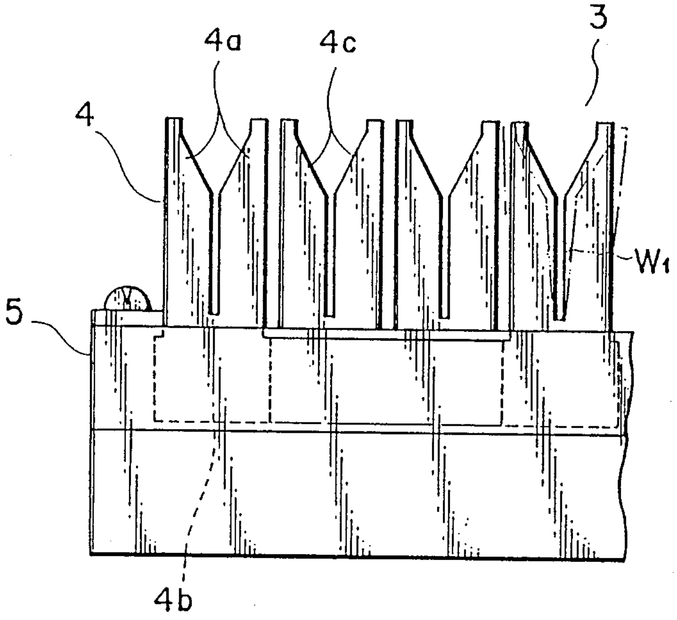

The wire clamp bars 3 that are commonly used in all the above processes are adapted to grip the opposite ends of the specified-length wire sections $W_1$ that are looped in U shape. As shown in FIG. 2*a*, 2*b*, a wire clamp 4 consists of a pair of opposing clamp pieces 4*a*, 4*a*. A large number of wire clamps 4 are arranged parallelly, with their bases 4*b* secured in a support frame 5 which is formed like a gutter in cross section. The paired clamp pieces 4*a* have opposing inclined surfaces 4*c* at their upper ends for guiding the wire, with a recessed groove 4*d* formed in one in the inclined guide surfaces and a raised strip 4*e* on the other, thereby permitting easy insertion and secure grip of wire.

In FIG. 1, designated H is a stock station that supplied free wire clamp bars 3 successively to the specified-length wire making device B by clamp bar holders 7 arranged at specified pitches on a pair of endless chains 6, 6.

The specified-length wire making device B consists mainly of a rotatable wire bending head 8 and a wire pulling head 9, and also has auxiliary components including a wire anchoring plate 10 and a transfer head 11.

Figure 3A:
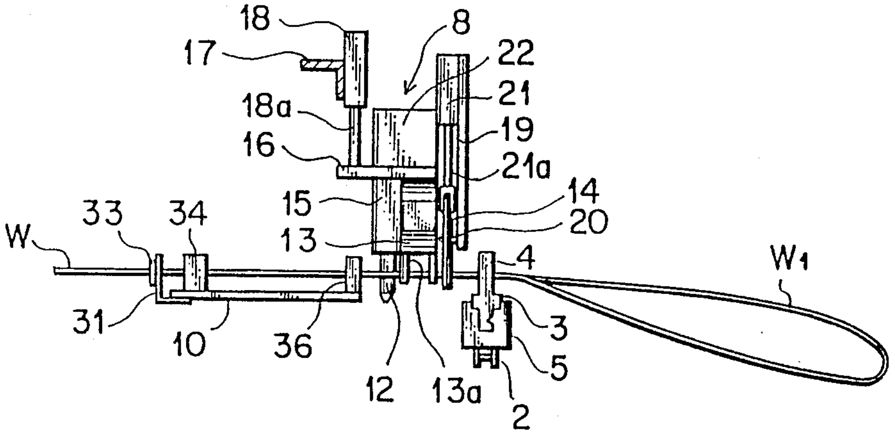
FIGS. 3*a* through 3*f* are elevational views showing the process of making specified-length wires according to this invention.
Figure 3B:
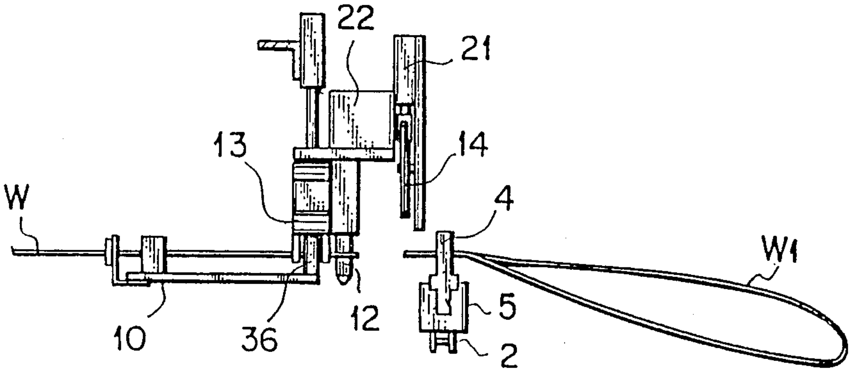
Figure 3C:
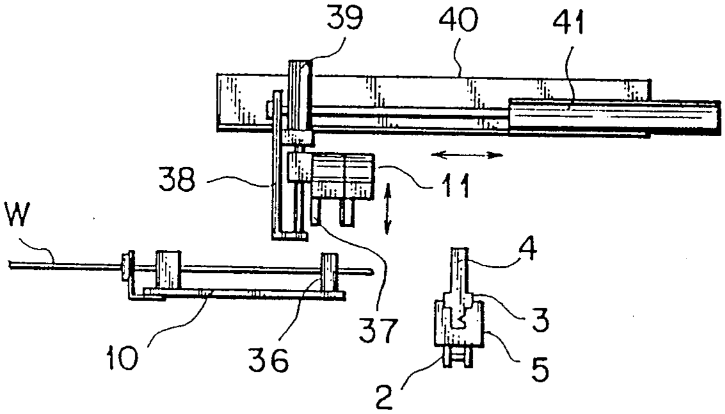

The rotatable wire bending head 8 is adpated to bend the fore end of the wire into the shape of a letter U. As shown in FIG. 3*a*, it has a pair of wire clamp plates 13 that can be opened and closed and can also be rotated through 180 degrees about a pin 12. The rotatable wire bending head 8 also has a pair of wire cutting blades 14 of known construction. The wire clamp plates 13 are located in front of a rotating sleeve 15 of the pin 12 and have a recess 13*a* as an escape for the wire clamp 4. A mounting base 16 for the rotating sleeve 15 is securely connected, through threads, to the front end of the piston rod 18*a* of a cylinder 18, which is secured to the frame 17 of a stay (not shown). The wire cutting blades 14 are mounted to a vertically disposed cutting blade mounting plate 19 located in front of the mounting base 16, through a pin 20 and a guide groove (not shown) in such a way that the blades 14 are vertically slidable. The upper end of each blade 14 is linked to the piston rod 21*a* of a cylinder 21. Thus, the wire cutting blades 14 can be vertically moved and opened and closed independently of the wire clamp plates 13. The wire cutting blades 14 may be separated from the rotatable wire bending head 8 and installed below the specified-length wire section $W_1$. Denoted 22 is a motor for turning the sleeve 15 in steps.

Figure 3D:
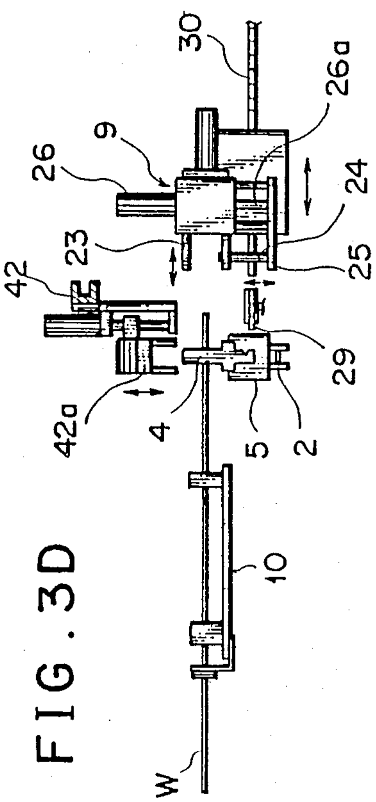

The wire pulling head 9 is adapted to pull the continuous wire to a desired length in making a wire section. As shown in FIG. 3*d*, the wire pulling head 9 has a pair of vertically spaced pin guide plates 23 and a wire hook pin 24 that passes through a hole (not shown) in the pin guide plates 23 to move up and down. A mounting base 25 of the wire hook pin 24 is securely connected, through threads, to the lower end of the piston rod 26*a* of a cylinder 26 secured to the head 9. The wire pulling head 9, as shown in FIG. 1, is mounted on a guide frame 27, which is arranged perpendicular to the transfer table 1. The head 9 is secured to an endless chain 30 that is driven by a metering motor 28 and a sprocket 2, both mounted on the guide frame 27, so that the head 9 can be moved toward and away from the transfer table 1.

The temporary wire anchoring plate 10 is used to retain the U-bent wires at specified pitches or intervals. The plate 10 has a wire distributor plate 31 on the side of the reel station A and a bar receiver block 32 for the wire clamp bar 3 on the side of the stock station H. The wire distributor plate 31 is mounted with a plurality of trumpet-shaped wire feed guide rings 33 spaced at constant intervals. In front of these rings 33 are a reverse wire feed prevention roll 34 and a wire guide tube 35, arranged in line with the guide ring 33. Installed by the side of the wire guide tube 35 are a pair of wire anchor plates 36.

The transfer head 11 is adapted to transfer the wire, whose end has been bent in a U shape on the temporary wire anchoring plate 10, to the wire clamp 4 on the wire clamp bar 3. The transfer head 11 has a pair of openable wire clamp plates 37, as with the rotary wire bending head 8. The transfer head 11 is vertically moved by a cylinder 39 of a head holder 38 and is also horizontally reciprocated by a cylinder 41 of a frame 40, which is supported above and across the temporary wire anchoring plate 10. In other words, the wire clamp plates 37 can be horizontally and vertically moved between the wire anchor plates 36 and the wire clamp 4.

Figure 3E:
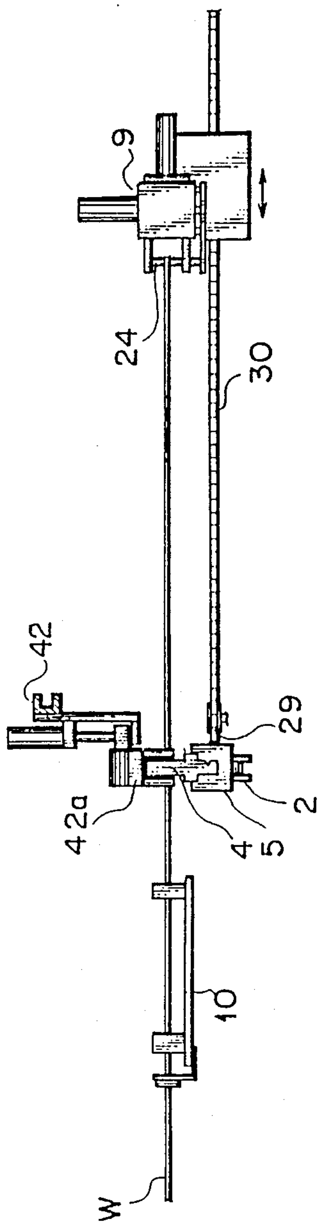

Arranged by the side of the rotary wire bending head 8 are a pair of wire fixing plates 42*a* which can be opened and closed and also vertically moved relative to a wire fixing head 42. The wire fixing plates 42*a* clamp the U-bent portion of the wire during the wire pulling process described later (FIGS. 3*d* and 3*e*).

The wire insulation stripping device D is adapted to cut and remove the insulation from the wire end, exposing a bare conductor of a required length for terminal crimping. This device may be of a known construction as in the case of the wire correction device C, and their descriptions therefore are not given.

Figure 5A:
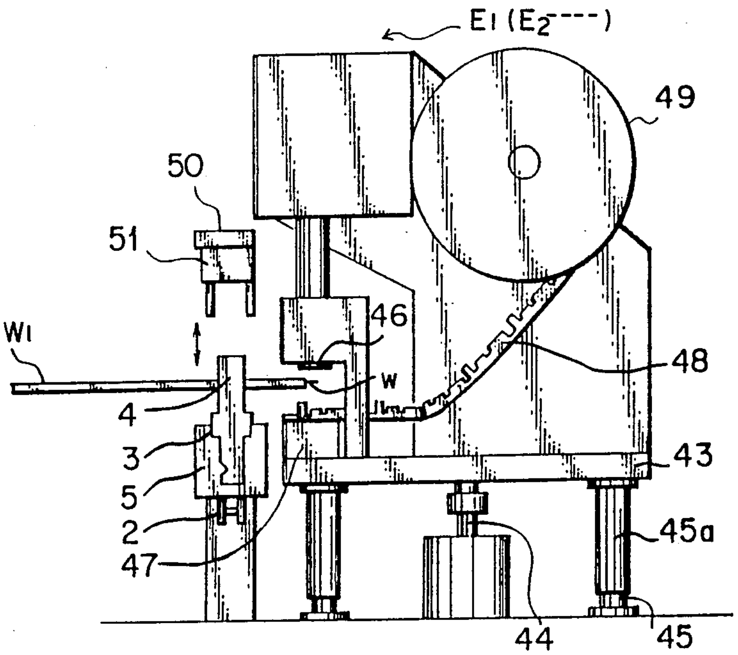
FIGS. 5*a* and 5*b* are schematic illustrations showing the process of continuously crimping the terminals according to this invention.
Figure 5B:
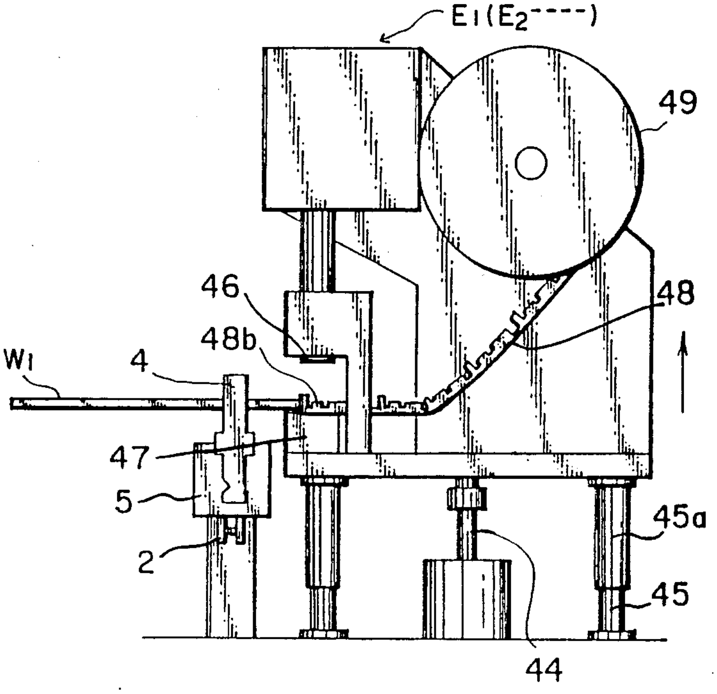

The terminal crimping devices $E_1$, $E_2$, . . . are adapted to crimp terminals of different kinds and the overall construction of the device is known. As shown in FIGS. 5*a* and 5*b*, the base 43 of each device is vertically movable by a lift cylinder 44, rods 45, and their guide tubes 45*a*. FIG. 5*a* shows the crimping device at the lowered position with the bare conductor w of the specified-length wire section $W_1$ disposed between an open ram 46 and a press bed 47. FIG. 5*b* shows the device at the lifted position with the conductor w placed on the press bed 47. In the figure reference numeral 48 designates chained terminals and 49 a terminal supply reel. Between the terminal crimping device $E_1$ and the insulation stripping device D is disposed a composite crimping head 50 that is used for composite crimping of wires. The composite crimping head 50 is vertically movable and has wire clamp plates 51 that can be opened and closed and are of the same construction as the preceding wire clamp plates 13, 37.

The terminal encasing device F is slidably mounted on a support frame 53, which is arranged parallel with and along the back of a setting table 52 on which a plurality of connector housings $I_1$, $I_2$, $I_3$, . . . are placed.

As shown in FIG. *6a*, the terminal encasing device F has a pair of terminal gripping pawls 54, a pair of wire gripping pawls 55, and a pair of wire clamp plates 56, these being able to be opened and closed. The terminal gripping pawls 54 and the wire gripping pawls 55, as shown in FIGS. *7a* and *7b*, are each formed as a hook with an L-shaped projection 54a, 55a at their front ends. A vertically movable terminal retainer plate 57 is provided between the terminal gripping pawls 54, 54. The terminal gripping pawls 54 clamps the wire crimping portion 48a of the terminal 48 from both sides.

Denoted 58 is a mounting head for the pawls 54, 55 and the wire clamp plates 56 whose head holder 59 is mounted slidable on a holder support plate 61 through vertically spaced two parallel guide rods 60 and a screw rod (not shown) so that. The mounting head 58 can be moved toward and away from the connector housings $I_1$, $I_2$, . . . The terminal gripping pawls 54 and the wire gripping pawls 55 are vertically movable by a cylinder (not shown) installed in the mounting head 58. Designated 63 is a cylinder foir lifting or lowering the terminal retainer plate 57. The holder support plate 61 has its base 62 screwed to the lower end of a piston rod 65a of a cylinder 65 mounted on a moving plate 64. The moving plate 64 is mounted slidable on a guide rail 66 of the support frame 53 through a pair of vertically arranged guide rolls 67. The moving plate 64 is moved by a step motor 68 mounted on the support frame 53 and by an endless chain 69 toward a desired connector housing ($I_1$, $I_2$, . . . ) placed on the setting table 52. Denoted 70 is a lock table for each connector housing $I_1$, $I_2$, . . .

As described above, the terminal gripping pawsl 54, the wire gripping pawls 55 and the wire clamp plates 56 are moved along with the moving plate 64 in parallel with the connector housings $I_1$, $I_2$, . . . and are raised or lowered together with the holder support plate 61 to move toward or away from the connector housings. The terminal gripping pawls 54 and the wire gripping pawls 55 are vertically moved by a cylinder in the mounting head 58 independently of the wire clamp plates 56.

The terminal encasing device F is provided with a centering mechanism for centering the terminals before insertion into the connector housing and with a check mechanism for checking the inserted condition after terminal insertion.

As shown in FIGS. *8a* and *8b*, the centering mechanism includes a sensor 71 located by the side of the electrical contact portion 48b of the terminal 48 that makes an electrical contact with a mating terminal (not shown). That is, the sensor 71 is positioned diagonally in front of the terminal gripping pawls 54, through a support arm (not shown) that is mounted on the mounting base 58a of the mounting head 58 of FIG. *6a* for the terminal gripping pawls 54 and the wire gripping pawls 55. The sensor 71 measures the difference between the actual distance l' from the sensor 71 to the terminal 48 and the predetermined distance l.

Figure 10:
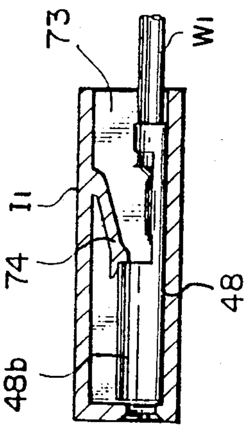
FIG. 10 is a cross-sectional view showing the terminal inserted in the connector housing.
Figure 9:
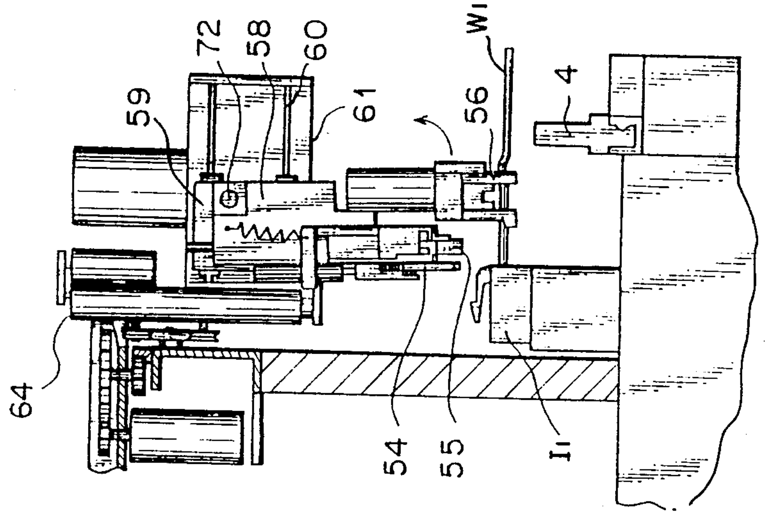
FIG. 9 is a schematic illustration of the check mechanism showing how the terminal insertion condition is checked.

The terminal insertion check mechanism, as shown in FIG. 9, is mounted on a support shaft 72 so that the mounting head 58 for the terminal gripping pawls 54 and the wire gripping pawls 55 can be swung about the support shaft 72 in the direction of an arrow with respect to the head holder 59. Instead of swinging the mounting head 58, it is possible to retract the head holder 59 along the guide rod 60 of the holder support plate 61. In a construction where the terminal 48 is held immovable by a retainer arm 74 in the terminal accommodating chamber 73 of the connector housing $I_1$ as shown in FIG. 10, it is preferable that the terminal 48 be pulled upward by the swing motion of the mounting head 58.

Now, we will explain the process, from making the specified-length wire to the terminal encasing, as well as the operation of each device.

Process of Making Specified-Length Wires

FIGS. *3a* and *4a* show the opposite ends of a cut wire held by two adjacent wire clamps 4 on the wire clamp bar 3. (This state will hereafter be referred to as an "end point.") Before reaching this state, the wire has undergone the following process. The end of the continuous wire W is drawn from the reel station A (FIG. 1) to the temporary wire anchoring plate 10 and then passed through the wire feed guide ring 33, the wire reverse feed prevention roll 34 and the wire guide tube 35. The wire is then pulled by the wire pulling head 9 so that the wire is looped like a letter U. The looped wire is cut by the wire cutting blade 14 of the rotary wire bending head 8 before being clamped at its ends by the two wire clamps.

The specified-length wire $W_1$, which was pulled and looped like a letter U and then cut, has a pulling distance L which is half the total wire length of almost 2L.

After cutting, the wire cutting blade 14 is moved up by the cylinder 21 as shown in FIG. *3b*, *4b* while almost at the same time the wire clamp plates 13 are rotated through 180° about the pin 12 by the motor 22 to bend the front end of the remaining continuous wire W into the U shape. The clamp plates 13 then presses the end of the bent portion into the pair of the wire anchor plates 36, next to the wire guide tube 35, for firm grip. After the end of the wire bent portion is fixed, the temporary wire anchoring plate 10 moves in the direction of arrow in FIG. 1 by one pitch (a distance between the adjacent wire clamps 4, 4 on the wire clamp bar 3).

In this way, after the continuous wire W was pulled and cut to form the specified-length wire $W_1$, the front end of the remaining continuous wire W is bent into the U shape, ready to undergo the next cycle of process of pulling and cutting to form a next specified-length wire. In FIG. 1, the temporary wire anchoring plate 10 (see FIG. *4b*) illustrated by two-dot line is shown holding a plurality of the U-bent continuous wires W by the wire guide tubes 35 and wire anchor plates 36. (This state is hereafter referred to as a "start point.")

FIG. *3c* and *4c* show the starting condition of the wire pulling process. In this state the transfer head 11 is moved by the cylinder 41 in the direction of arrows to a position above the wire anchor plates 36, and a pair of wire clamp plates 37 are lowered to grip the U-bent portion and the opposing portion of the continuous wire W. The wire clamp plates 37 are then retracted upward in the reverse sequence and transfer the wire onto the wire clamps 4 (FIG. *4d*).

Next, as shown in FIG. *3d* and *4d*, the wire fixing plates 42a of the wire fixing head 42 are lowered to cause the U-bent portion to be clamped by the wire clamps 4. At the same time, the wire pulling head 9 moves toward the U-bent portion as the metering motor 28 rotates (FIG. 1). At this time the wire hook pin 24 is in a lowered position so that the front part of the upper and lower pin guide plates 23, 23 are open to allow the U-bent portion to advance between the guide plates 23, 23. Then, the wire hook pin 24 is raised by actuating the cylinder 26 to close the front part of the guide plates 23, 23.

Figure 4A:
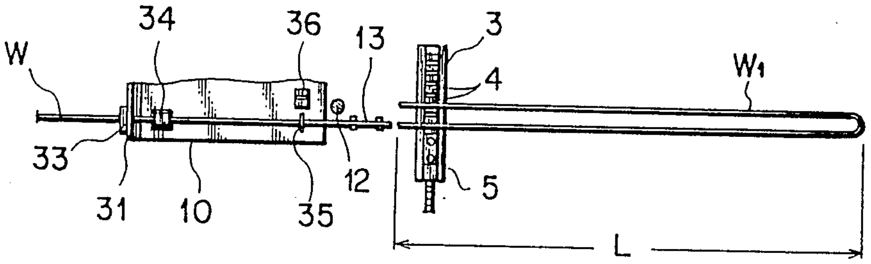
FIGS. 4*a* through 4*e* are plan views showing the process of making specified-length wires according to this invention.
Figure 4B:
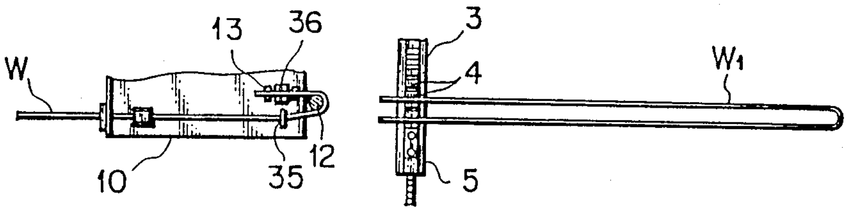
Figure 4C:
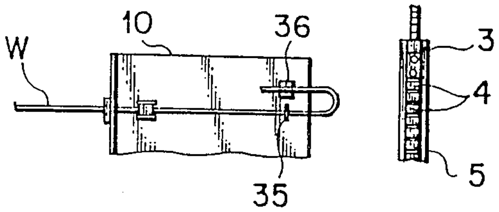
Figure 4D:
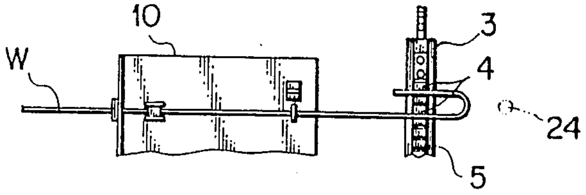
Figure 4E:
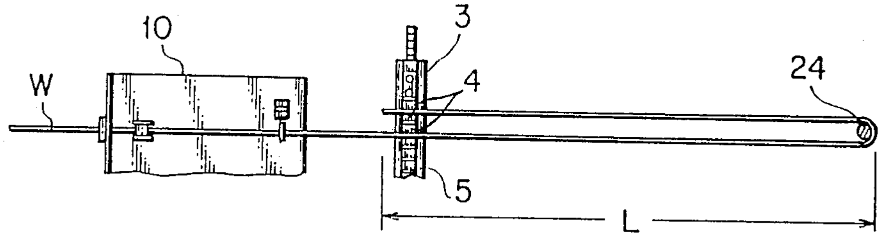

Then, as shown in FIG. 3*e* and 4*e*, the wire pulling head 9 is retracted half the required wire length (L) in a sequence reverse to the above. And the wire hook pin 24 is lowered to release the wire, followed by the wire fixing plates 42*a* being raised to the original position.

Figure 3F:
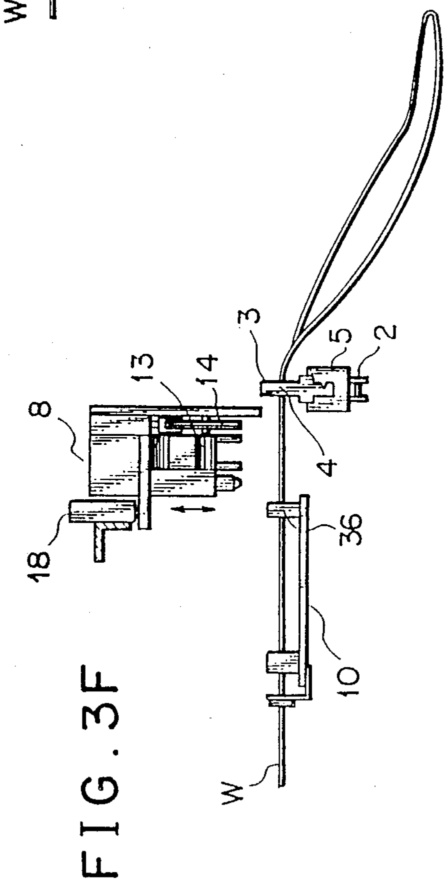

Lastly, as shown in FIG. 3*f*, the rotary wire bending head 8 is lowered by activating the cylinder 18 toward the folded continuous wire W to clamp the wire by its wire clamp plates 13 and cut it by the wire cutting blade 14. Now the process returns to the "end point" of FIG. 3*a*. In this way, the continuous wires W are successively bent in U shape, transferred to the position indicated by two-dot line of FIG. 1, and clamped by the newly supplied wire clamp bar 3.

With the above process completed, the wire sections $W_1$ almost 2L in length are obtained.

By repeating the process from the "start point" to the "end point" in FIG. 3*a* through 3*f* and FIG. 4*a* through 4*e*, a primary intermediate product $P_1$ of the wire harness is obtained which consists of a plurality of specified-length wires $W_1$ of the same or different lengths secured at both ends to the wire clamps 4 on the wire clamp bar 3.

While, in the above specified-length wire producing process, the wire clamp bar 3 on which the wire clamps are arranged is used as a means for fixing both ends of the specified-length wires $W_1$, it is possible to use, instead, wire clamping tools (each consisting of a pair of clamping pieces that can be opened and closed) which are arranged on an endless chain at specified intervals or pitches, as disclosed in the Japanese Patent Examined Publication No. 12604/1987. It will be readily understood that the three processes-U-bending the front end of the continuous wire W, pulling the bent portion and cutting the wire-as well as their working positions can be separated from each other. Further it is also possible to eliminate the transfer head 11 and its associated process of transferring the U-bent portion of the wire from the temporary wire anchoring plate 10 onto the wire clamp bar 3.

Wire Insulation Stripping and Correction Process

Figure 11A:
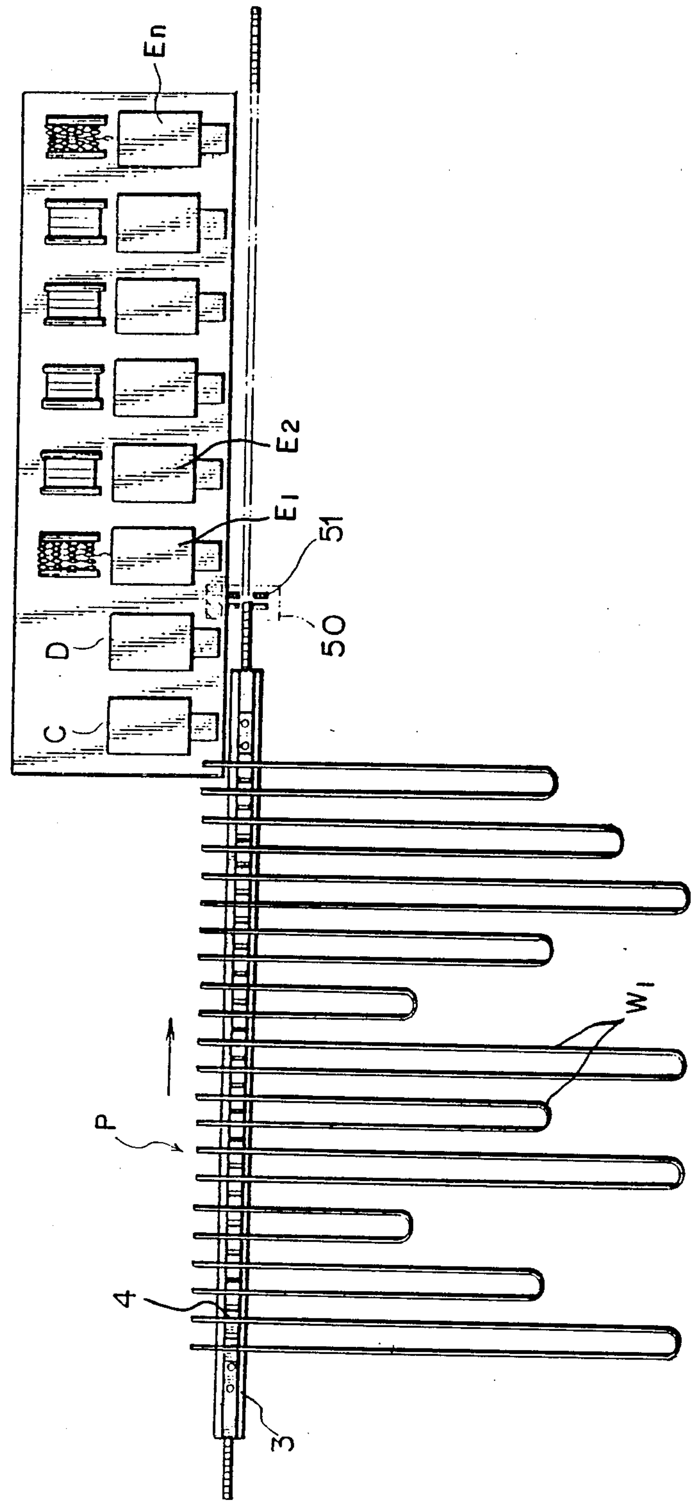
FIGS. 11*a* through 11*d* are schematic illustrations showing the processes, from the correction and insulation stripping of the specified-length wires to the terminal crimping, according to this invention.

The primary intermediate product $P_1$, as shown in FIG. 1 and FIG. 11*a*, is fed in the direction of arrow on the transfer table 1' one pitch at a time and removed of twisting or warping at the wire ends by the wire correction device C. The intermediate product $P_1$ then is stripped of insulation by the wire insulation stripping device D.

Terminal Crimping Process

Figure 11B:
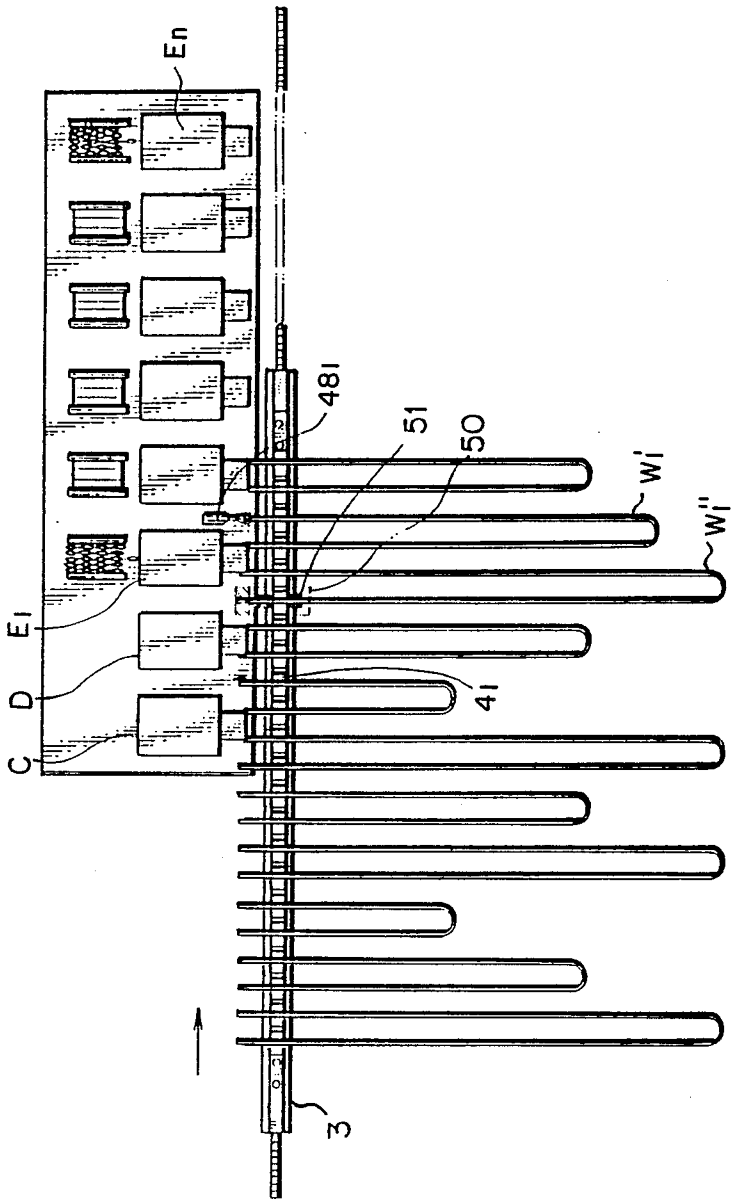
Figure 11C:
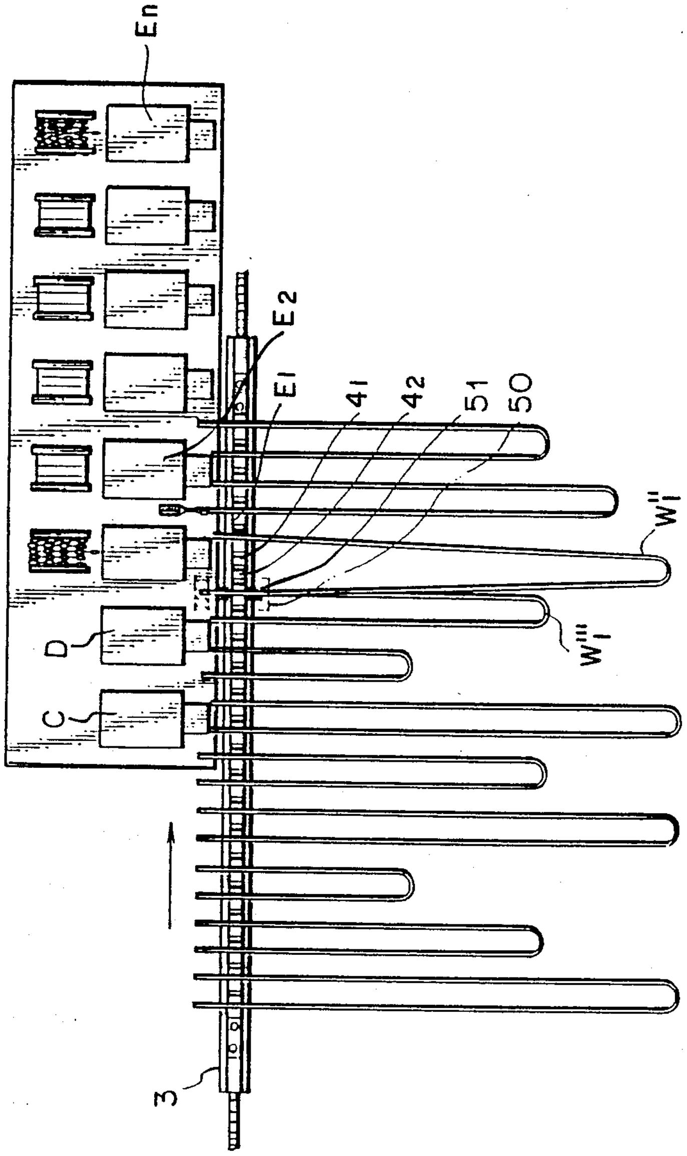

The terminal crimping devices $E_1$, $E_2$, ... of FIG. 1 have their ram 46 and press table 47 opened and are at the lowered position, as shown in FIG. 5*a*. Into this open space between the ram and the press table the ends of the specified-length wires $W_1$ secured to the wire clamp bar 3 are intermittently fed one pitch at a time. The crimping devices $E_1$, $E_2$, ... each have a chain of terminals 48 of different sizes and shapes. Thus, specified-length wires $W_1$ are successively crimped at both ends with desired terminals 48, which are assigned to specific devices $E_1$, $E_2$, ... FIGS. 11*b* and 11*c* show one end of the specified-length wire $W_1'$ crimped with a terminal $\mathbf{48}_1$ by the device $E_1$. Crimping is done in the following known process. As shown in FIG. 5*a*, 5*b*, the crimping device $E_1$ is raised by the cylinder 44. Then, the wire end 48*a* to be crimped with a terminal 48 is placed on the press table 47 and the ram 46 is lowered to crimp the terminal. After crimping, the device $E_1$ is operated in the reverse sequence, i.e., returned to the lowered position of FIG. 5*a*.

The continuous terminal crimping may also be achieved by arranging the wire clamp bar 3 and the group of the crimping devices $E_1$, $E_2$, . . . in such a manner that either of them can be moved toward and away from the other.

Composite Terminal Crimping Process

The composite crimping in which two or more wires are crimped to one terminal is achieved during the above crimping process.

That is, as shown in FIG. 11*b*, a vertically movable composite crimping head 50 is located between the insulation stripping device D and the terminal crimping device $E_1$, with its wire clamp plates 51 disposed immediately above the wire clamp $\mathbf{4}_1$. The wire clamp plates 51 are lowered to grip the end of the specified-length wire $W_1''$ and then moved up. Then, the wire clamp bar 3 is moved one pitch and the wire clamp plates 51 are lowered to place the wire end on the other specified-length wire $W_1'''$, which is clamped by the adjacent wire clamp $\mathbf{4}_2$, so that the ends of the wire $W_1''$ and the wire $W_1'''$ are clamped together, as shown in FIG. 11*c*.

Figure 12:
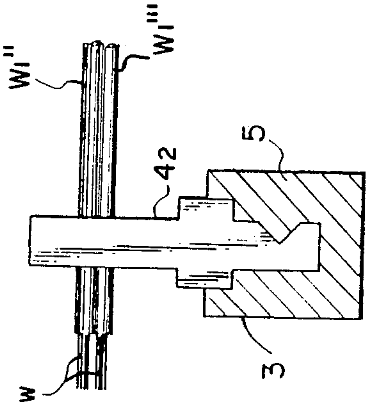
FIG. 12 is an elevational view showing two specified-length wires clamped by a single wire clamp for composite crimping.

FIG. 12 shows the two specified-length wires $W_1''$ and $W_1'''$ clamped together by the wire clamp $\mathbf{4}_2$. When the wire clamp $\mathbf{4}_2$ has reached the desired terminal crimping device ($E_1$, $E_2$, . . . ) as a result of intermittent feeding of the wire clamp bar 3, one terminal is clamped on the two wire ends as in the normal crimping process.

The composite crimping (FIG. 12) to crimp multiple wires with one terminal can be performed more easily and in greater versatility by moving the composite head 50 parallel to the wire clamp bar 3 between the desired specified-length wires $W_1$.

Figure 11D:
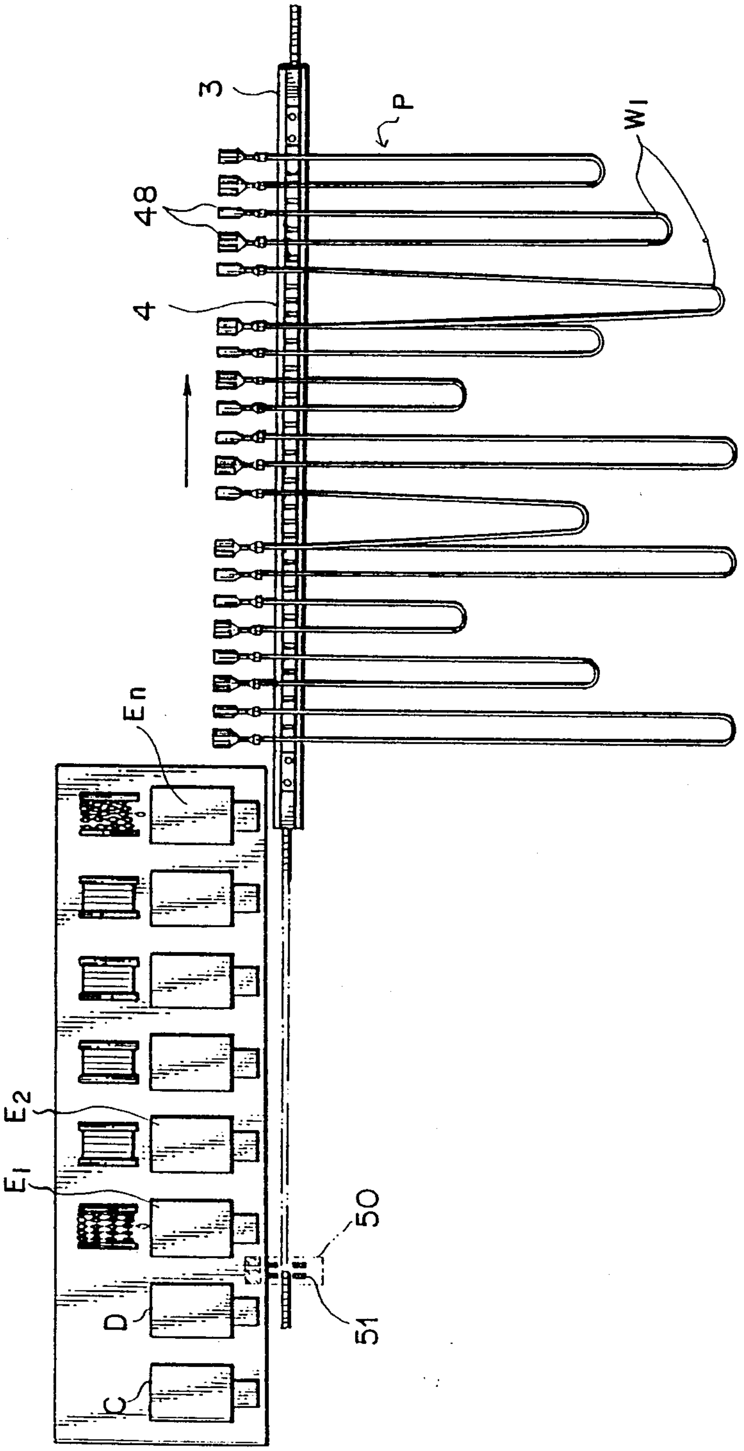

In this way, as shown in FIG. 11*d*, a second intermediate product $P_2$ is obtained in which a plurality of terminated specified-length wires $W_1$ with single or composite terminations are fixed at both ends by the wire clamps 4 on the wire clamp bar 3.

Encasing process

The second intermediate product $P_2$ *is* transferred at one time onto the setting table 52 where a plurality of connector housings $I_1$, $I_2$, $I_3$ and $I_4$ are placed.

Figure 6B:
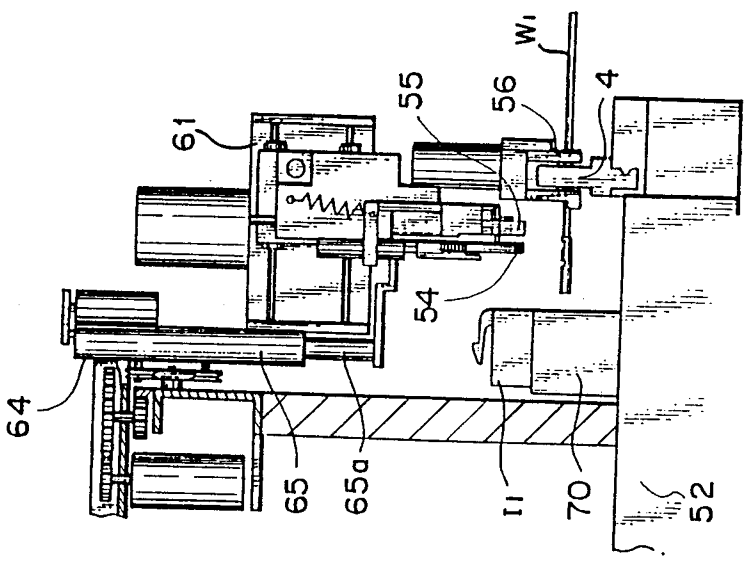
FIGS. 6*a* through 6*g* are schematic illustrations showing the process of encasing the terminated wires according to this invention.
Figure 6A:
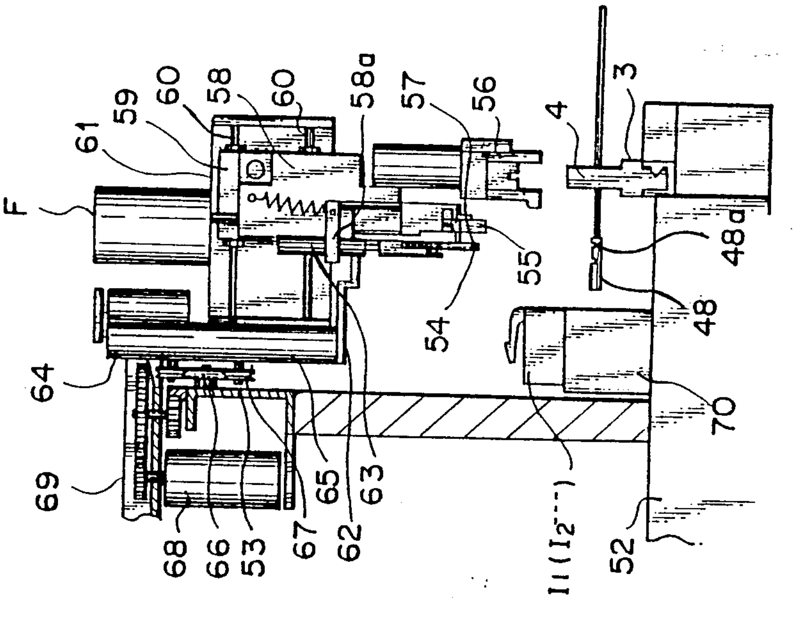

Then the moving plate 64 is moved by the step motor 68 along the guide rail 66, as shown in FIG. 6*a*, until it comes immediately above the desired wire clamp 4.

Figure 6D:
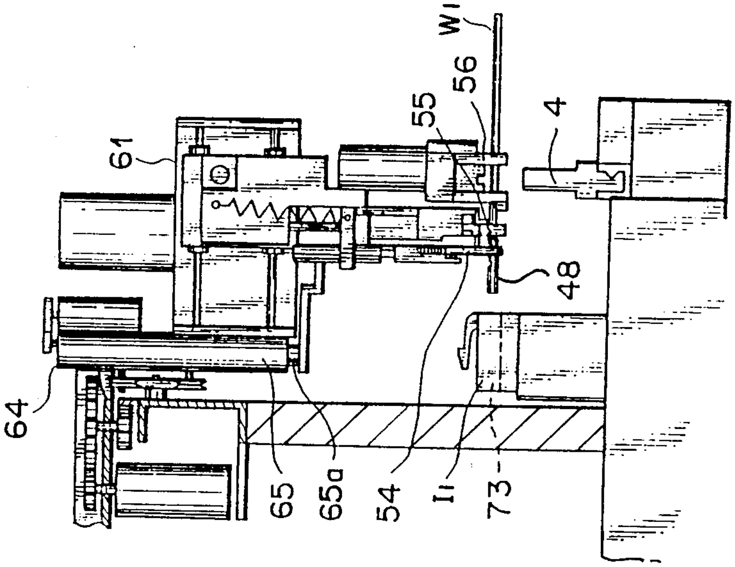
Figure 6C:
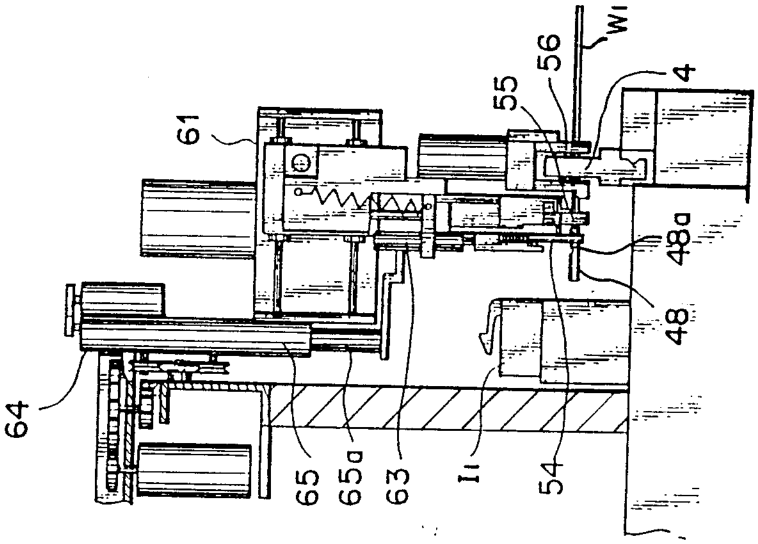

Next, the cylinder 65 is activated to lower the holder support plate 61, i.e., the wire clamp plates 56 to grip the specified-length wire $W_1$ (FIG. 6*b*), followed by the lowering of the terminal gripping pawls 54 and the wire gripping pawls 55 to grip the crimping part 48*a* of the terminal 48 and the wire $W_1$ from both sides (FIG. 6*c*).

Figure 7A:
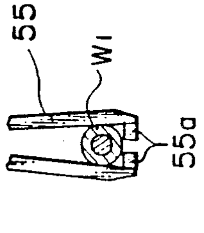
FIGS. 7*a* and 7*b* are enlarged schematic illustrations showing the wire and the terminal clamped during the terminal encasing process.
Figure 7B:
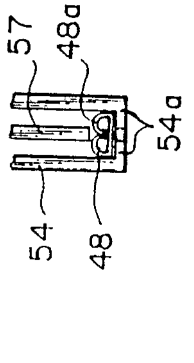

At this time, as shown in FIGS. 7*a* and 7*b*, the terminal retainer plate 57 between the terminal gripping pawls 54, 54 is lowered by actuating the cylinder 63 to push down the terminal 48 and set it almost horizontal through cooperation with the projections 54*a* and 55*a*.

Next, the terminal gripping pawls 54, wire gripping pawls 55 and wire clamp plates 56 are moved up, reverse to the preceding operation sequence, to remove the wire $W_1$ from the wire clamp 4 and, if necessary, the moving plate 64 is moved laterally, as mentioned earlier, to a position where the front end of the terminal 48 faces the terminal accommodating chamber 73 (FIG. 10) of a housing chosen from a plurality of connector housings $I_1$, $I_2$, . . . (FIG. 6*d*).

Figure 6G:
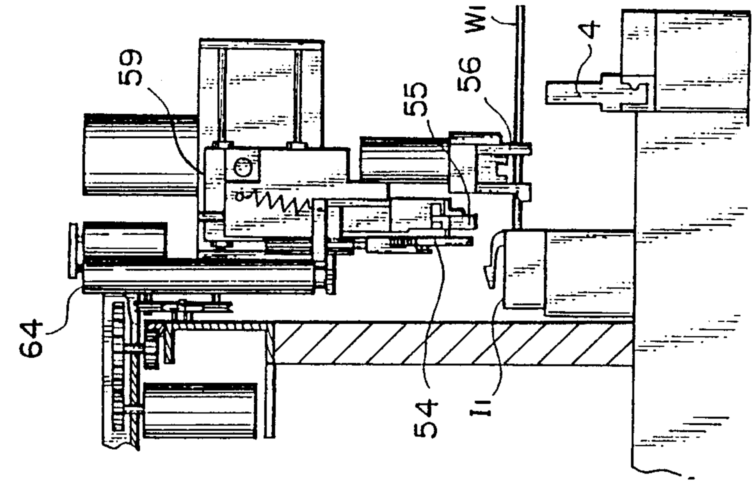
Figure 6F:
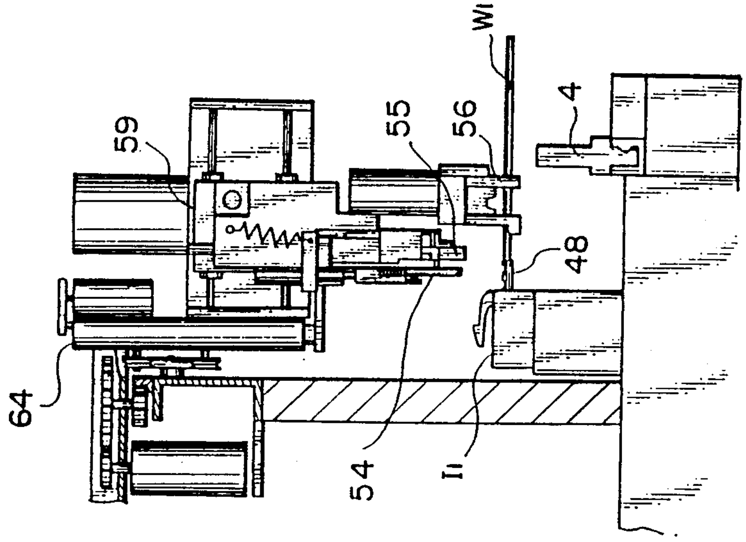
Figure 6E:
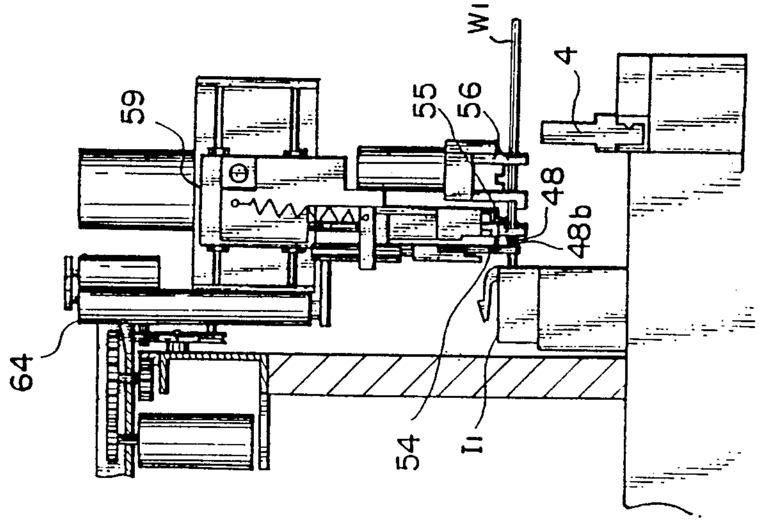

Next, as shown in FIGS. 6*e* and 6*f*, the head holder 59 is advanced toward the connector housing to insert the electric contact portion 48*b* of the terminal 48 into the terminal accommodating chamber 73. The terminal gripping pawls 54 and the wire gripping pawls 55 are then opened and moved up.

Then, as shown in FIG. 6*g*, with the wire $W_1$ held by the wire clamp plates 56, the head holder 59 is further advanced to insert the terminal 48 into the terminal accommodating chamber 73. Now, as shown in FIG. 10, the terminal 48 is engaged and secured by the retainer arm 74.

By repeating the above sequence of operation, it is possible to insert the terminal 48 of a desired specified-length wire $W_1$ into a desired terminal accommodating chamber 73 of any connector housing ($I_1$, $I_2$, . . . ).

Terminal centering mechanism

Figure 8B:
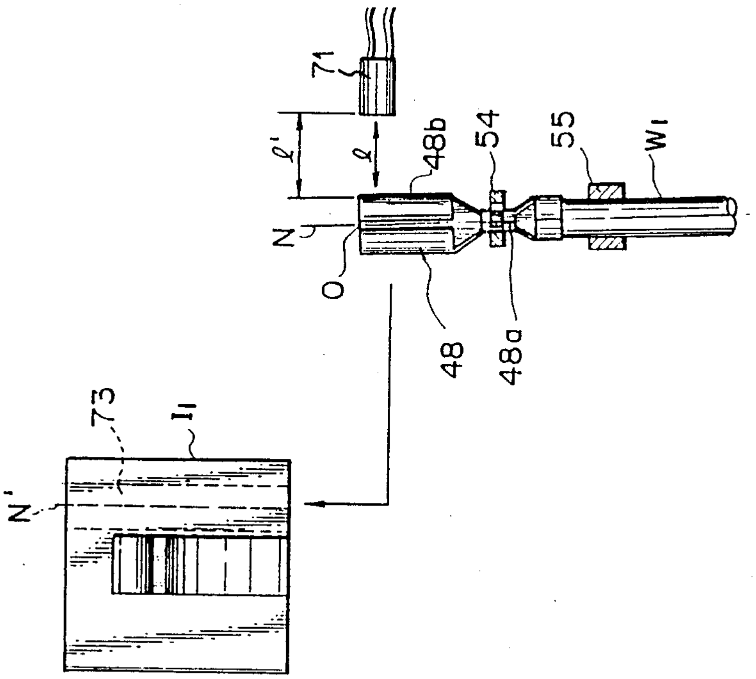
FIGS. 8*a* and 8*b* are schematic illustrations of the terminal centering mechanism showing how the axis alignment is done during the terminal encasing process.
Figure 8A:
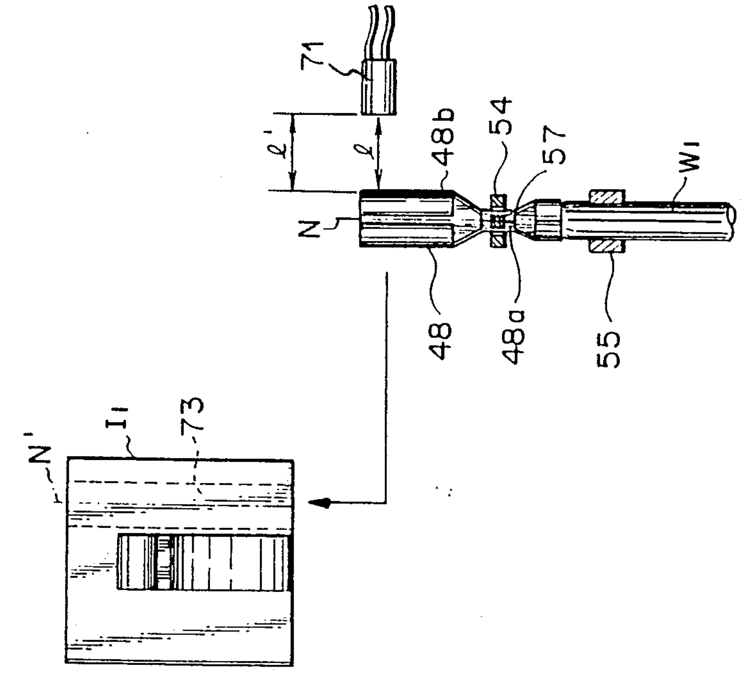

In FIGS. 6*d* and 6*e*, when inserting the terminal 48 into the terminal accommodating chamber 73, there is no problem if their axes N and N' are parallel as shown in FIG. 8*a*. When, however, the axis N of the terminal 48 is inclined, smooth insertion cannot be made.

To avoid this problem, the sensor 71 is used to detect the difference between the setting value l and the actual distance l' from the sensor 71 to the front end of the terminal. If there is no difference, the terminal is moved by a distance l before being inserted. But when there is a difference ($\pm\Delta l$), the moving plate 64 is moved $l\pm\Delta l$ for correct alignment.

The setting value l varies depending on the shape and size of the terminal 48 and thus these data are stored beforehand in the controller G for each kind of terminal. The sensor 71 may be of the known type which has a light emitting element and a light receiving element, formed of phototransistors. It is also possible to measure and compare the reflection angle instead of the distance l, l'.

In the axis alignment process, the terminal axis N need not necessarily be disposed parallel to N' and the only requirement for smooth insertion is that the center O of the front end of the terminal 48 coincides with the axis N' of the terminal accommodating chamber 73.

Terminal Insertion condition check mechanism

The terminal encasing process is completed by inserting the terminal 48 into the chamber 73 as shown in FIG. 6*g*. It is desirable that a check be made to see if the terminal is correctly inserted or not.

As shown in FIG. 9, the mounting head 58 is swung back in the direction of arrow to apply a specified tension to the wire $W_1$. This reveals any imperfect insertion of the terminal. Instead of swinging the mounting head 58, the wire clamp plates 56, i.e., the head holder 59 may be retracted, as mentioned earlier.

Figure 14:
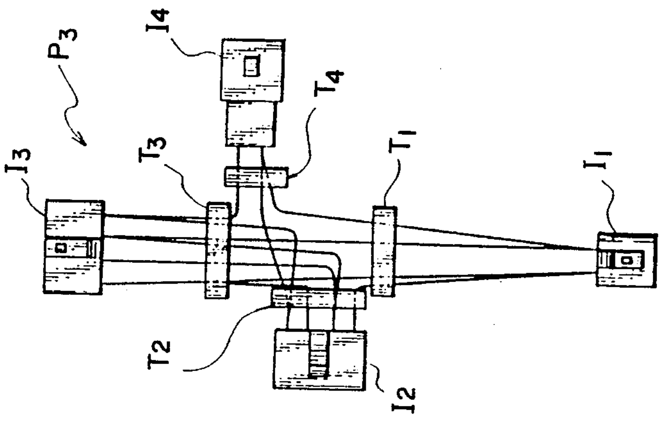
FIGS. 13 and 14 are schematic illustrations showing how the specified—length wires—that have undergone encasing process according to the invention—are arranged in the form of normal wire harness.
Figure 13:
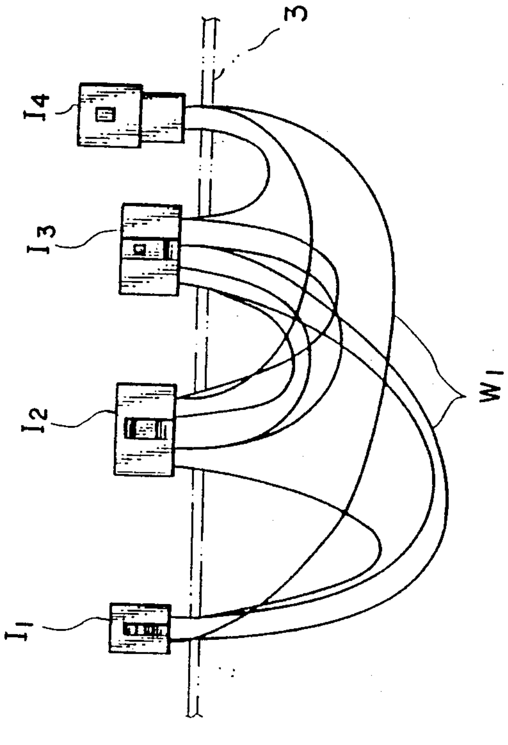

FIG. 13 shows a group of encased specified-length wires $W_1$ removed from the wire clamp bar 3. The encased specified-length wires $W_1$, each connected in U shape between the connector housings $I_1$, $I_2$, $I_3$ and $I_4$, are bundled together by taping $T_1$, $T_2$, $T_3$, . . . at appropriate locations. When arranged in their correct relative positions, the final product $P_3$ of the wire harness as shown in FIG. 14 is obtained.

It will be appreciated from the foregoing description that, according to this invention, the equipment and the method for making specified-length wires for wire harness are simple and enable precise measuring of wire length and continuous production in a short time, achieving an improved productivity and a substantial reduction in cost.

What is claimed is:

1. A method of making specified-length wires for a wire harness from continuous wires, comprising the steps of:

fixing a front end of a U-bent continuous wire on a holding member;

transferring a U-bent portion onto another holding member and fixing it thereto and pulling the U-bent wire to pay out a predetermined amount thereof; and cutting the U-bent, pulled wire at a portion substantially opposite to the front end.

2. A method of making specified-length wires for a wire harness from continuous wires, comprising the steps of:

bending a continuous wire in a U-shape;

fixing a front end of a U-bent continuous wire on a holding member;

transferring a U-bent portion onto another holding member and fixing it thereto and pulling the U-bent wire to pay out a predetermined amount thereof; and cutting the U-bent, pulled wire at a portion substantially opposite to the front end.

3. A method of making specified-length wires for a wire harness from continuous wires, comprising the steps of:

bending a continuous wire that is held on a holding member on a temporary wire anchoring plate into a U shape;

transferring a U-bent portion onto another holding member and fixing it thereto;

pulling the transferred and fixed U-bent continuous wire to pay out a predetermined amount thereof; and cutting the U-bent, pulled wire at a portion almost opposite to the front end.

4. A method of making specified-length wires for a wire harness from continuous wires, as set forth in claim 2 or 3, wherein the continuous wire is bent in a U shape through a support shaft.

5. An apparatus for making specified-length wires for a wire harness, comprising:

a rotatable wire bending head for holding the front end of a continuous wire by wire clamp plates and bending the wire in a U shape;

a wire pulling head for engaging or holding a U-shaped portion and pulling it in the axial direction of the wire to pay out a predetermined amount thereof; and a cutting blade for cutting the U-bent, pulled wire at a portion substantially opposite to the front end.

6. An apparatus for making specified-length wires for a wire harness, as set forth in claim 5, wherein the rotatable wire bending head has a support shaft about which the wire clamp plates make a U-turn.

7. An apparatus for making specified-length wires for a wire harness, as set forth in claim 5, wherein the rotatable wire bending head is provided with a cutting blade.

8. An apparatus for making specified-length wires for a wire harness, comprising:

a temporary wire anchoring plate having a first holding member for holding a front portion of a continuous wire;

a rotatable wire bending head having wire clamp plates, the rotatable wire bending head being adapted to hold a front end of the continuous wire by the wire clamp plates and bending the wire in a U shape;

a transfer head for holding a U-bent portion of the wire and transferring the wire to a second holding member, the second holding member being adapted to clamp the wire at specified intervals;

a wire fixing head having wire fixing plates, the wire fixing head being adapted to fix the U-bent wire clamped by the second holding member;

a wire pulling head for engaging or holding the U-bent portion and pulling it in the axial direction of the wire to pay out a predetermined amount thereof; and a cutting blade for cutting the U-bent, pulled wire at a portion substantially opposite to the front end.

9. An apparatus for making specified-length wires for a wire harness, as set forth in claim 8, wherein the second holding member consists of a plurality of parallelly arranged wire clamps.

10. An apparatus for making specified-length wires for a wire harness, as set forth in claim 8, wherein the second holding member consists of a plurality of clamping tools that can be opened and closed and which are mounted to an endless chain at specified intervals.

* * * * *

UNITED STATES PATENT AND TRADEMARK OFFICE

CERTIFICATE OF CORRECTION

PATENT NO. : 4,976,294

DATED : December 11, 1990

INVENTOR(S) : Shigeji KUDO ET AL

It is certified that error appears in the above-identified patent and that said Letters Patent is hereby corrected as shown below:

On the title page, Item [75], "Suzuki Sanae" should read --Sanae Suzuki--

Signed and Sealed this

Twenty-eighth Day of July, 1992

*Attest:*

DOUGLAS B. COMER

*Attesting Officer*

*Acting Commissioner of Patents and Trademarks*